Nov. 3, 1942.   R. H. WHITELEY   2,300,754
SELF-LUBRICATING BEARING
Original Filed July 20, 1936

Inventor:
Robert H. Whiteley
By Williams, Bradbury,
McCaleb & Hinkle, Attys.

Patented Nov. 3, 1942

2,300,754

UNITED STATES PATENT OFFICE 2,300,754

SELF-LUBRICATING BEARING

Robert H. Whiteley, Oak Park, Ill., assignor, by mesne assignments, to Randall Graphite Products Corporation, Chicago, Ill., a corporation of Delaware Application July 20, 1936, Serial No. 91,449
Renewed December 7, 1939

2 Claims. (Cl. 308—132)

The present invention relates to self-lubricating bearings, and is particularly concerned with self-lubricating bearings which are self-aligning or capable of universal movement. The particular bearings involved in the present application are peculiarly adapted to be used as replacements for self-aligning ball bearings, and at the present time a very wide field of application has been found for self-lubricating bearings of this type in air conditioning and cooling equipment.

While the present self-aligning bearings are capable of being used in any place where self-aligning ball bearings would be used, they are of particular advantage in air conditioning equipment for the reason that the air conditioning equipment usually is provided with air shafts for carrying the air to various parts of the house. Difficulties have been experienced with self-aligning ball bearings in this equipment for the reason that the rolling of the balls causes a rumbling sound, which is amplified and transmitted to every part of the house by means of the air shafts.

Wherever self-aligning bearings of the present type have been brought to the attention of manufacturers of air conditioning equipment, they have immediately replaced the more expensive and noisy ball bearings, and devices embodying the present invention have, therefore, become very popular and have met with immediate acceptance by the trade.

One of the objects of the invention is the provision of an improved self-aligning bearing which is adapted to replace or be substituted for self-aligning ball bearings, particularly in air conditioning equipment or television equipment, where lack of noise and vibration is essential.

Another object of the invention is the provision of an improved self-lubricating bearing which is also adapted to be self-aligning so that the bearing may be moved to a limited amount of universal movement and aligned with the shaft or other bearings automatically.

Another object of the invention is the provision of an improved bearing which is adapted to be resiliently secured in position so that it is self-aligning and also adapted to be fixedly secured in position after it has become aligned.

Another object of the invention is the provision of an improved self-aligning self-lubricating bearing, the universal movement of which is limited to a predetermined amount by means of a filling spout or fitting with which the bearing is provided.

Another object of the invention is the provision of an improved self-lubricating bearing having a reservoir of a predetermined shape which is adapted to give the bearing a self-aligning or universal movement characteristic so that the bearing may be utilized in machinery where self-aligning ball bearings were formerly thought necessary, thereby greatly reducing the cost of the machinery.

Another object of the invention is the provision of an improved self-aligning, universal self-lubricating bearing which is adapted to conserve lubricant by virtue of the provision of an auxiliary reservoir or catch basin adapted to receive the lubricant which might otherwise be wasted, and to return it to the bearing surfaces.

Referring to the drawing, in which similar characters of reference indicate similar parts throughout the similar views, Fig. 1 is a side elevational view in partial section, showing a self-aligned, self-lubricating bearing constructed according to the present invention;

The present application is a continuation in part of my prior application, Ser. No. 622,599, filed July 15, 1932, now Patent No. 2,048,763.

Figure 1:
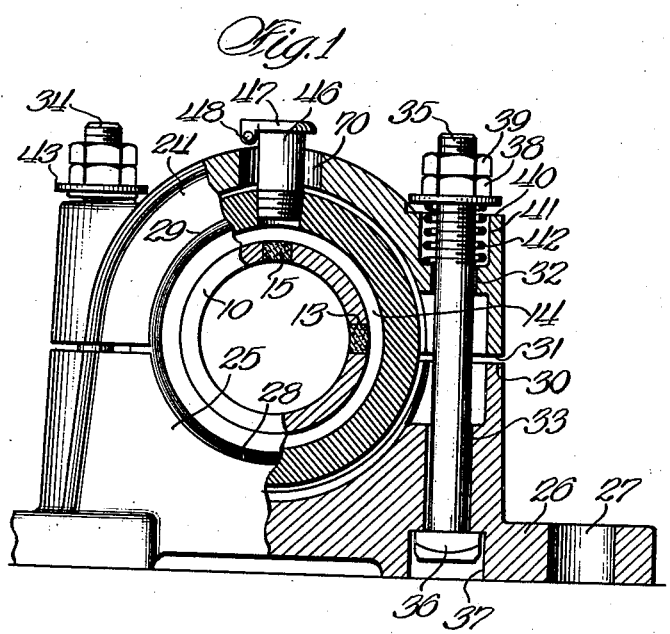
Figure 2:
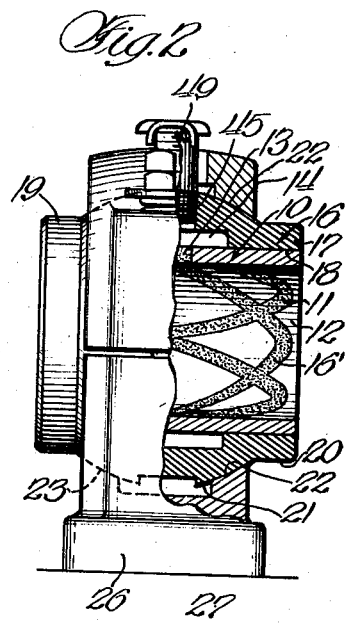
Fig. 2 is a similar end view, with a partial section taken on a vertical plane, passing through the axis of the bearing.

Referring to Figs. 1 and 2, the bearings constructed according to the present invention preferably utilize a bearing sleeve 10, made of bearing metal such as bearing brass, bronze or the like, which is provided with grooves 11 located on the inner cylindrical bearing surface 12. The grooves 11 may consist of substantially elliptical, closed or re-entrant grooves which extend longitudinally and transversely across the cylindrical bearing surface from one end of the bearing to the other, and which are so located that a plurality of the loops cross each other so as to make lubricant available to every part of the surface of the bearing 10.

The bearing sleeve 10 is preferably provided with a plurality of apertures 13 extending from the grooves 11 to the rear side of the sleeve 10.

the apertures 13 being adapted to communicate with a reservoir 14.

The grooves 11 and apertures 13 are preferably provided with a porous carbon or graphite compound which is initially plastic and which is intruded into the apertures and pressed into the grooves 11 by pressure while in a plastic state. This plastic graphite compound may be purchased upon the open market.

When the plastic graphite compound is pressed into the grooves and/or apertures into intimate contact with the metal, the compound takes the shape of the adjacent metal, and it is then baked in place, the baking operation rendering the initially plastic graphite compound solid and porous in such manner that it is adapted to feed lubricant continuously in very small quantities to the bearing surface. The porous graphite compound passes lubricant more readily as the lubricant becomes thinner and less viscous and, therefore, whenever the bearing surface requires additional lubrication, so that the bearing surface becomes warm, there is an additional flow of lubricant through the graphite plugs 15 and the graphite distributing members 15' located in the grooves 11.

The bearing is preferably also provided with lubricant of a type adapted to melt at a predetermined temperature, and I have found it particularly efficacious to utilize petroleum jelly for the lubricant because petroleum jelly melts at a predetermined temperature, which is only slightly above the ordinary room temperature. Petroleum jelly is solid at ordinary room temperatures, and therefore lubricant does not flow until the bearing has become heated to the predetermined melting temperature.

The walls of the reservoir 14 are in heat conducting relation with the bearing sleeve 10 and the bearing surface 12 so that the heat generated in the bearing surface is transmitted to the solidified lubricant in the reservoir 14.

The temperature at which the lubricant melts may be accurately predetermined by mixing relatively solid lubricating material with liquid or viscous lubricating material, and I do not wish to be limited to any particular temperature or range of temperatures. The lubricant composition which is given herein is merely exemplary of one of the predetermined temperatures for one particular purpose, and practically any desired temperature may be attained within the range of a melting temperature of solidified lubricating material.

For instance, water pumps of a particular type may run at a temperature of about 160 to 180 degrees F. at the bearings. One form of lubricant for melting at a predetermined temperature may consist of a mixture of 50% of petrolatum by volume, with 50% of ordinary cylinder oil, such as Polarine, which has a viscosity of 175 at 180 degrees F. Ordinary petrolatum is solid below 132 degrees F., and it begins to melt at about 128 degrees F. Such a mixture of lubricants is substantially solid at temperatures below the melting temperature of the mixture, but the mixture may liquefy at a temperature of about 128 degrees F., and as soon as the pump bearing has reached this predetermined temperature, the flow of lubricant begins.

For example, in air conditioning equipment the solidified lubricant should melt at a substantially lower temperature, or liquid lubricant could be used. In any event, the present bearing is adapted to provide an increased flow of the lubricant under any conditions so that there is absolutely no danger of the bearing becoming hot due to lack of lubricant because the heating of the bearing inevitably causes the flow of lubricant.

The bearing being heat responsive, the expansion of the gases and/or lubricant in the reservoir 14 with the further thinning action of heat on the lubricant causes an increased flow of lubricant with an increase in temperature, and while the present bearing is capable of operating for years without replenishment of the lubricant, the bearing surface is always constantly supplied with just enough lubricant to maintain the desired oil film, and the action of the graphite also aids in assuring adequate lubrication.

The present bearing may take a number of different forms.

Referring to Figs. 1 and 2, the bearing sleeve 10 comprises a substantially cylindrical tubular member. The bearing sleeve 10 preferably has a pressed frictional fit inside the reservoir casing 16 which is provided with inwardly extending radial flanges 17 having cylindrical surfaces 18 adapted to fit the bearing sleeve 10 very closely. If desired, the reservoir casing 16 may be heated before placing it upon the bearing sleeve 10, or the bearing sleeve 10 may be suitably cooled and contracted before being pressed into the reservoir casing 16.

The reservoir casing 16 is provided with a circumferentially extending groove preferably located midway between its ends on the inside, forming a reservoir 14 in connection with the sleeve 10.

The outside of the reservoir casing 16 may be substantially cylindrical at 19 and 20 adjacent each end, but the major portion of the outer surface of the reservoir casing 16 is preferably provided with a spherical surface 21. The spherical or ball shaped surface is substantially complementary to the partially spherical surfaces 22, 23 located at each side of each end of each of the pillow blocks 24, 25. In other words, the pillow blocks are provided with annular surfaces 22, 23 at each end, the annular surfaces comprising grooves substantially circular in cross section and complementary to the spherical surface 21 on the outside of the reservoir casing.

The spherical surfaces 22, 23 on the pillow blocks do not completely cover the ball formation 21 on the bearing reservoir, and therefore the ball 21 is adapted to rotate in the spherical socket 22, 23 of the pillow blocks 24, 25. The bearing sleeve 10 and reservoir casing 16 may, therefore, take any of a multiplicity of different positions, due to their universal movement in the pillow blocks, and the present bearing is adapted to replace ordinary self-aligning ball bearings at a much lower expense.

The lower pillow block 25 comprises a metal member which is formed with laterally projecting attaching flanges 26, having holes 27 for receiving the screw bolts which are used to attach the lower pillow block in place. The pillow block is provided with partially spherical surfaces 22, 23 and has a semi-circular aperture 28 which cooperates with another semi-circular aperture 29 on the upper pillow block 24 to form a circular aperture of larger size than the cylindrical end portion 19 or 20 of the reservoir casing. The reservoir casing projects from the pillow blocks at each end.

The pillow blocks are provided with flat surfaces 30, 31 which cooperate with each other to permit the pillow blocks to be clamped closer together, if desired, and the pillow blocks are provided with transverse apertures 32, 33 adapted to receive the bolts 34, 35 which clamp the pillow blocks together. Bolts 34, 35 are preferably provided with non-circular heads 36 adapted to be received in non-circular sockets 37 so that the bolt is held against rotation when the nut 38 or lock nut 39 is turned.

The upper pillow block is of substantially the same shape as the lower pillow block, except that it has no attaching flanges, and it is provided with substantially flat surfaces 40 surrounding the counterbore 41 which communicates with the bore 32. The counterbore 41 is adapted to receive a helical coil spring 42 surrounding the bolt 35 in the counterbore 41, and the bolt is preferably provided with a washer 43, forming a seat for the upper end of the coil spring 42. The lower end of the coil spring 42 rests against an annular shoulder 44 at the end of counterbore 41.

The reservoir 14 may be filled by immersing the sleeve 10 and reservoir casing 16 in oil during their assembly or by filling the reservoir 14 with hard lubricant prior to its assembly with the sleeve 10. The reservoir is preferably provided with a threaded bore 45 located in the ball surface 21 at one side and adapted to receive the threaded end of a tubular metal member 46. Where the bearing is utilized with the tubular member 46 in substantially upright position, it may be provided with a spring pressed cap 47 rotatably mounted on a pin 48, which is carried by one side of a tubular member 46. A spring 49 about the pin 48 urges the cap 47 into closed position, and the cap 47 prevents foreign material from entering the tubular filling spout 46.

Figure 3:
Fig. 3 is a view, similar to Fig. 1, of another modification of the invention in partial section, to show the details of construction.
Figure 4:
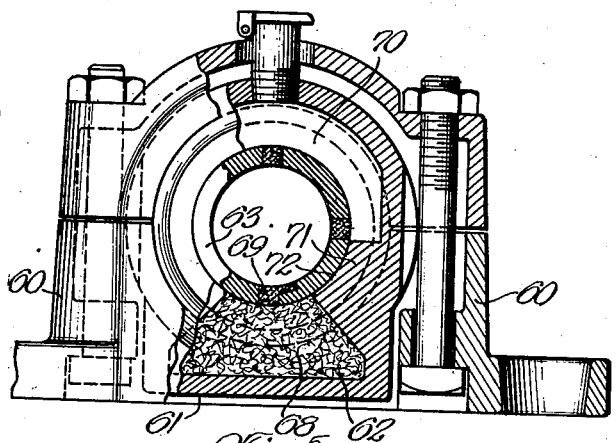
Fig. 4 is a view of the modification shown in Fig. 3, in partial section, showing the details of construction.
Figure 4:
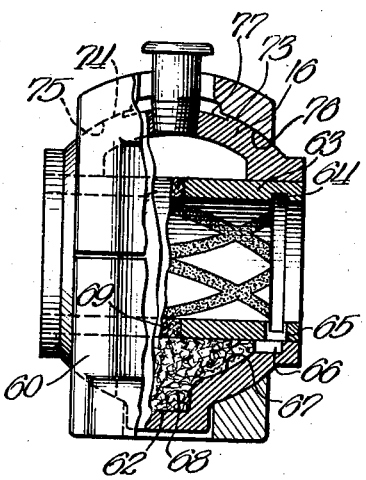
Figure 5:
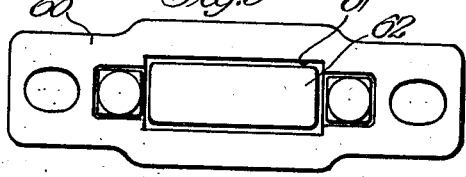
Fig. 5 is a bottom plan view of the bearing shown in Fig. 3.

Referring to Figs. 3 and 4, these are modifications in which the springs 42 are eliminated and the lower half of the bearing, comprising the member 60, which is equivalent to the member 26 of Fig. 1, is formed with a centrally located rectangular aperture 61, having a suitable clearance to permit limited universal movement of the ball member which is provided with a depending auxiliary reservoir 62 that is rectangular in plan in Fig. 5.

The bearing sleeve 63 in this case is preferably provided with a peripherally extending groove 64 located at each end of the bearing sleeve, just inside the end of the sleeve and adapted to receive excess lubricant which may leak out from the bearing along the shaft. This groove 64 communicates at its lower part with an aperture 65, extending through the sleeve and communicating with a laterally extending conduit 66.

The conduit 66 leads to an auxiliary reservoir 67 which is filled with wicking 68, and any excess lubricant is adapted to be conducted to this auxiliary reservoir 67 and absorbed by the wicking 68. The wicking 68 is in communication with the porous carbon lubricating member 69 located in the lower wall, and the excess lubricant in the auxiliary reservoir is to be conducted to the carbon compound in the grooves and again distributed over the bearing surface.

Referring to Fig. 3, it will be noted that the upper or main reservoir 70 does not extend fully about the bearing sleeve, but it is terminated by an inwardly extending partition 71 at each side, adjacent the bottom, the partition having a partially cylindrical wall 72 also engaging the bearing sleeve and separating the space around the bearing sleeve into the main reservoir 70 and the auxiliary reservoir 68.

The auxiliary reservoir depends from the ball member into the space 61, where it is spaced from the walls of the aperture 61, and a limited universal movement is permitted, but the auxiliary reservoir walls definitely prevent more than a predetermined amount of universal movement.

Referring to Figs. 2 and 4, it should also be noted that I prefer to shape the ball member 16 with partially spherical surfaces 73 in the form of a strip 73, 74 about each side of the ball, thereby machining only such portion of the ball as is necessary to engage complementary inner spherical, peripheral strips 75, 76 formed on the inside of the pillow blocks. Thus it is not necessary to machine all of the surface of the ball, but only sufficient at each side of the ball to engage complementary surfaces on the pillow blocks.

The other part of the ball at 77 may have a rough cast surface with a clearance between it and the pillow block.

It will thus be observed that I have invented an improved, self-lubricating bearing which is adapted to permit a limited universal movement so that the bearing may be self-aligning. The present bearing is adapted to replace ball bearings in air conditioning and cooling equipment, and is of particular importance in such equipment because ball bearings cause a rumbling sound, due to the rolling of the balls. This rumbling is transmitted to every part of the house by means of air shafts, and that noise is wholly eliminated by the use of the present self-lubricating bearings.

While I have illustrated and described a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a self-lubricating bearing, the combination of a supporting base, said base being provided with attaching means, with a complementary bearing supporting member carried by said base, said base and member being formed with partially spherical depressions for receiving a ball-shaped reservoir member, and said base and member being formed with a pair of substantially parallel peripherally extending tracks of spherical cross section for engaging said ball-shaped reservoir, a ball-shaped reservoir engaging said tracks, and said ball-shaped member having a bearing provided with conduits extending into the reservoir of said ball-shaped member and porous carbon lubricant members in said conduits for conducting lubricant from the reservoir to the bearing surface of said bearing, said reservoir member being provided with a depending chamber, and conduits extending from the bearing surface to said depending chamber for collecting the excess lubricant, said depending chamber having means for absorbing the lubricant and conducting it to the adjacent porous carbon lubricant conducting members.

2. A self-lubricating universal bearing comprising a bearing sleeve formed with a plurality of grooves in its bearing surface and with conduits extending through said sleeve, a porous carbon lubricant-conducting compound in said grooves and conduits, a reservoir member having an outer partially spherical portion and having cylindrical surfaces at each end for engaging the outer cylindrical surface of said sleeve, said reservoir member having an annular recess formed therein which is closed by said sleeve to form the reservoir, a pair of supporting members having complementary partially spherical surfaces for engaging the outer spherical surfaces on said reservoir, one of said latter members having attaching flanges for its securement to a support, and both said members having through bores for receiving securing bolts whereby said members may be secured on said reservoir to support it for substantially universal movement, said sleeve having a lubricant collecting groove at one of its ends formed in the bearing surface and having a conduit extending from said groove through said sleeve, and said reservoir member having a second reservoir formed at its bottom communicating with said latter conduit and filled with an absorbent material adapted to conduct lubricant to the porous carbon filling of said first-mentioned conduits.

ROBERT H. WHITELEY.